United States Patent
Burkhart et al.

(10) Patent No.: US 9,573,217 B2
(45) Date of Patent: Feb. 21, 2017

(54) THERMAL CONTROL SYSTEM FOR A HYBRID WELDER

(71) Applicant: Lincoln Global, Inc., City of Industry, CA (US)

(72) Inventors: Bryan Scott Burkhart, Chardon, OH (US); Adam Hruska, Chardon, OH (US)

(73) Assignee: Lincoln Global, Inc., City of Industry, CA (US)

(*) Notice: Subject to any disclaimer, the term of this patent is extended or adjusted under 35 U.S.C. 154(b) by 632 days.

(21) Appl. No.: 14/032,742

(22) Filed: Sep. 20, 2013

(65) Prior Publication Data
US 2015/0083701 A1   Mar. 26, 2015

(51) Int. Cl.
*B23K 9/10* (2006.01)

(52) U.S. Cl.
CPC ........... *B23K 9/1081* (2013.01); *B23K 9/1006* (2013.01)

(58) Field of Classification Search
CPC ............................ B23K 9/1006; B23K 9/1081
USPC ......... 219/133, 134; 454/184; 165/206, 254, 165/287; 361/676–678
See application file for complete search history.

(56) References Cited

U.S. PATENT DOCUMENTS

| | | | |
|---|---|---|---|
| 5,710,507 A | 1/1998 | Rosenbluth | |
| 5,795,664 A | 8/1998 | Kelly | |
| 6,455,186 B1 | 9/2002 | Moores, Jr. et al. | |
| 6,575,258 B1* | 6/2003 | Clemmer | B60K 11/02 165/41 |
| 6,747,246 B2 | 6/2004 | Crandell, III | |
| 7,259,355 B2* | 8/2007 | Bender | B23K 9/1006 219/133 |
| 7,777,447 B2 | 8/2010 | Vogel | |
| 2001/0040061 A1* | 11/2001 | Matuda | B60H 1/00278 180/68.2 |
| 2005/0167169 A1* | 8/2005 | Gering | B60H 1/00278 237/12.3 B |
| 2011/0114607 A1* | 5/2011 | Albrecht | B23K 9/1006 219/108 |
| 2012/0200241 A1* | 8/2012 | Kojima | B60L 11/1872 318/139 |
| 2012/0312789 A1 | 12/2012 | Bavhammar et al. | |
| 2014/0051345 A1* | 2/2014 | Bauer | F24F 3/0522 454/267 |

* cited by examiner

*Primary Examiner* — Tu B Hoang
*Assistant Examiner* — Alba Rosario-Aponte
(74) *Attorney, Agent, or Firm* — Brad C. Spencer

(57) ABSTRACT

A hybrid welder having a motor-driven welder assembly including a motor; an energy storage device electrically connected to the motor-driven assembly; a heat transfer assembly, the heat transfer assembly being in thermal communication with the motor and the energy storage device, wherein the heat transfer assembly is selectively adaptive to transfer heat from the motor to the energy storage device.

8 Claims, 5 Drawing Sheets

THERMAL CONTROL SYSTEM FOR A HYBRID WELDER

TECHNICAL FIELD

The present invention generally relates to hybrid welders having an engine driven component and an energy storage device. More particularly, the present invention relates to a thermal control system that monitors and controls the temperature within the energy storage device compartment.

SUMMARY OF THE INVENTION

The present invention generally includes a hybrid welder including a motor-driven welder assembly having a motor; an energy storage device electrically connected to the motor-driven welder assembly; a heat transfer assembly, the heat transfer assembly is in thermal communication with the motor and the energy storage device, where the heat transfer assembly is adapted to transfer heat from the motor to the energy storage device.

The invention further includes a hybrid welder where the transfer assembly includes a fan selectively operable to provide fluid heated by the motor over the energy storage device.

The invention further includes a hybrid welder where the energy storage device and the motor are separated by a divider, where the heat transfer assembly includes a valve operable to selectively transfer heat from the motor through the divider.

The invention further includes a hybrid welder where the divider defines an opening of where the valve is located at the opening an operable to selectively open and close the opening, and wherein the heat transfer assembly includes a fan adaptive to draw heated air from the motor through the opening and director toward the battery assembly.

The invention further includes a hybrid welder where the energy storage device is located in a compartment, wherein the fan is located in the compartment.

The invention further includes a hybrid welder where the heat transfer assembly includes a heat exchanger located in thermal communication with the motor, a second heat exchanger located adjacent to the energy storage device, and a fan adapted to provide fluid over the second heat exchanger toward the energy storage device.

The invention further includes a hybrid welder where the first heat exchanger and second heat exchanger are fluidly connected and wherein a thermal fluid is selectively circulated between the heat exchangers to transfer heat from the first heat exchanger to the second heat exchanger.

The invention further includes a hybrid welder where the heat transfer assembly includes a heat sink in thermal communication with the motor and extending toward the energy storage device.

Figure 1:
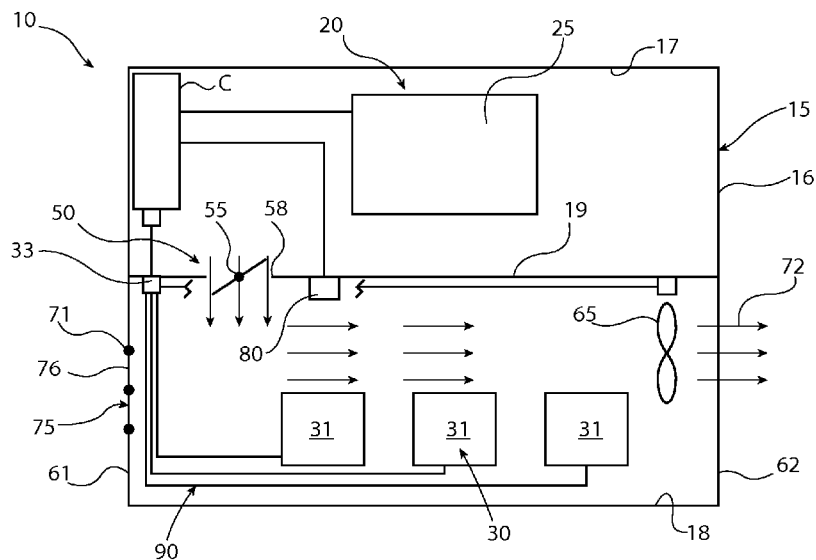
FIG. 1 is a schematic view of a hybrid welder according to the concepts of the present invention shown in a heating mode where an external vent to a compartment housing an energy storage device is closed and a valve between the motor-driven welder and energy storage device compartment is open to allow heated air from the motor-driven welder to be drawn into the compartment.

The following description and the annexed drawings set forth in detail certain illustrated aspects of the claimed subject matter. These aspects are indicative of but a few of the various ways in which the principals of the innovation may be employed and the claimed subject matter is intended to include all such aspects and there equivalence. Other advantages and novel features of the claimed subject matter will become apparent from the following detailed description of the invention when considered in conjunction with the drawings.

DETAILED DESCRIPTION OF THE INVENTION

As used herein, spatially orienting terms such as "above," "below," "upper," "lower," "inner," "outer," "right," "left," "vertical," "horizontal," "top," "bottom," "upward," "downward," "laterally," "upstanding," et cetera, can refer to respective positions of aspects as shown in or according to the orientation of the accompanying drawings. "Inward" is intended to be a direction generally toward the center of an object from a point remote to the object, and "outward" is intended to be a direction generally away from an internal point in the object toward a point remote to the object. Such terms are employed for purposes of clarity in describing the drawings, and should not be construed as exclusive, exhaustive, or otherwise limiting with regard to position, orientation, perspective, configuration, and so forth.

Although the subject innovation has been shown and described with respect to a certain preferred embodiment or embodiments, it is apparent that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The present invention generally relates to a power source employing an engine driven component and an energy storage device. The power source may be used in a variety of applications where outlet power is not available or when outlet power will not be relied on as the sole source of power including portable power generation, backup power generation, heating, plasma cutting, welding, and gouging. The example discussed herein relates to welding operations, such as, arc welding, plasma cutting, and gouging operations. The welding application shown is not limiting as it will be appreciated that the thermal control system of the present invention, described, herein may be used in other applications that combine a motor and an energy storage device in a hybrid energy system. For convenience the power source will be referred to herein as a hybrid welder. It will be understood that this terminology is not limiting.

A hybrid welder according to the invention is generally indicated by the number 10 in the drawings. Hybrid welder 10 includes an engine component that runs on fuel allowing the hybrid welder 10 to be portable. It will be appreciated that hybrid welder 10 may also be mounted in a permanent location depending on the application. Hybrid welder 10 generally includes a motor-driven welder assembly 20 having a motor 25 and an energy storage device 30. Motor 25 may be an internal combustion engine operating on any known fuel including but not limited to gasoline, diesel, ethanol, natural gas, hydrogen, and the like. These examples are not limiting as other motors or fuels may be used.

The motor 25 and energy storage device 30 may be operated individually or in tandem to provide electricity for the welding operation and any auxiliary operations performed by hybrid welder 10. For example, individual operation may include operating the motor 25 and supplementing the power from the motor 25 with power from the energy storage device 30 on an as needed basis. Or supplying power from the energy storage device 30 alone when the motor 25 is offline. Tandem operation may also include combining power from motor 25 and energy storage device 30 to obtain a desired power output. According to one aspect of the invention, a welder 10 may be provided with a motor having less power output than ordinarily needed, and energy storage device 30 used to supplement the power output to raise it to the desired power output level. For example, a motor with no more than 19 kW (25 hp) output may be selected and supplemented with six 12V batteries, as shown in the depicted example. Other combinations of motor output may be used and supplemented with more or less power from energy storage device. The above example, therefore, is not limiting.

Energy storage device 30 may be any alternative power source including a secondary generator, kinetic energy recovery system, or, as shown, one or more batteries 31. In the example shown, six 12 volt batteries 31 are wired in series to provide power in connection with motor-driven welder assembly 20. Batteries 31 shown are lead acid batteries. Other types of batteries may be used including but not limited to NiCd, molten salt, NiZn, NiMH, Li-ion, gel, dry cell, absorbed glass mat, and the like.

With reference to FIG. 1, hybrid welder 10 may include a frame 15 on which components are mounted. Frame 15 may be made part of a housing 16 that encloses the hybrid welder components. In the example shown, housing 16 includes a first compartment 17 and a second compartment 18, where the first compartment is located above the second compartment. This arrangement is not limiting and the compartments may be arranged in other relationships including for example side by side on with other structures or compartments separating the first and second compartments. In the example shown, a divider 19 separates the first compartment 17 from second compartment 18. Motor driven welder assembly 20 is located within first compartment 17 and energy storage device 30 is located within second compartment 18.

As discussed above, motor driven welder assembly 20 may include motor 25 that provides power for a desired welding operation. The power from motor 25 may be controlled by a welder controller, which may simply be referred to as a controller C herein. When an internal combustion engine is used, motor driven welder assembly 20 may also include a fuel tank 26 fluidly connected to motor 25 by a supply line. The fuel tank 26 may be in a variety of locations within housing 16, mounted externally of housing 16 or remotely from welder 10. In the example shown, fuel tank 26 is located near the bottom of first compartment 17 below motor 25. A filler nozzle 27 may extend from fuel tank 26 to a position accessible by the user to fill fuel tank 26. In the example shown, filler nozzle 27 extends upward from fuel tank 26 along one side of housing 16 and opens externally of housing at an upper surface thereof. A removable filler cap is provided to selectively open and close fuel nozzle 27.

Hybrid welder 10 includes an energy storage device 30 that also is used to provide electrical energy. Controller C may also control operation of energy storage device 30. To that end, controller C is electrically connected to energy storage device 30 and may receive power output from energy storage device 30 to combine it with power from motor 25 or otherwise regulate output from motor 25 and energy storage device 30.

It will be appreciated that an energy storage device 30 may have a desired operating temperature range. For example, for the batteries 31 shown, it is desirable for the batteries to be in an environment that is −20 degrees Celsius to 60 degrees Celsius for consistent output and to avoid premature discharge. Depending on the manufacturer specifications, the type of energy storage used, or materials used in energy storage device, the temperature range will vary from this example. As a result, the range is provided as an example and is not limiting. Likewise, the desirable operating temperature or range of operating temperatures may depend on the operation of the welder. For example, it may be desirable to operate in a first temperature range for power output purpose and a second temperature range to hold the charge within energy storage device. In the battery example provided, power output and battery life are generally inversely related. The battery's capacity increases as temperature increases within the operating range. In this example, within the middle of the operating range at about 25 degrees Celsius the battery life and capacity are balanced. This point is considered the battery's 100% level. Below this operating temperature, battery life may increase while the battery capacity is reduced, and above this temperature battery life decreases while capacity increases. Conversely, battery life decreases as temperature increases within the operating range. In terms of a percentage, from −20 degrees Celsius to 50 degrees Celsius, the battery capacity ranges from about 40% to about 120% while the battery life ranges from 200% to about 20%. Battery capacity is an indicator of voltage output and run time. At higher capacity, the run time is longer and the voltage is higher than at lower capacity.

Controller C may be programmed to optimize the temperature range based on how the welder 10 is being used or switch between ranges based on how the welder 10 is used. Considerations for controller C may include desired voltage output, run time, and battery life. For example, while the welder 10 is used to perform a welding operation that requires higher voltage or longer run time from energy storage device 30, the controller C may operate in a capacity mode, where controller C operates to place energy storage device 30 in a temperature range optimized for capacity. While the welder 10 is idling or when optimal power from energy storage device 30 is not required by the welding operation, controller C may switch to life mode, where energy storage device is maintained in a temperature range optimized for maintaining the charge within energy storage device.

To attempt to keep the energy storage device within this desired operating range, a thermal control system, generally indicated by the number 45, is provided. Thermal control assembly 50 may include a heat transfer assembly 50 providing thermal communication between the motor driven welder assembly 20 and energy storage device 30. In cooler climates, it may be necessary to heat the energy storage device 30 to maintain energy storage device 30 in a desired operating temperature range. To that end, heat generated by the motor 25 in the motor driven welder assembly 20 may be transferred to energy storage device 30. With reference to FIG. 1, heat transfer assembly 50 includes a valve 55 that selectively allows a thermal fluid, including but not limited to air, that receives heat from motor 25 to flow from first compartment 17 to second compartment 18. Valve 55 may be located within housing 16 or outside of housing. Valve 55 may be any device capable of controlling the flow of thermal fluid between first compartment and second compartment.

With reference to FIG. 1, valve may be supported within an opening 58 formed in divider 19. Valve 55 is actuatable between an open configuration and a closed configuration to control the flow of thermal fluid between first compartment 17 and second compartment 18. FIG. 1 shows valve 56 in an open condition allowing warmer air from first compartment 17 to flow into second compartment 18. Opening 58 and valve 55 may be located at any location on divider 19. Likewise communication between first compartment 17 and second compartment 18 may be created at locations other than divider 19 and ducting may be provided as needed. In the example shown, opening 58 is located near a first end 61 of second compartment 18.

A fan 65 may be provided to provide a pressure differential between first compartment 17 and second compartment 18 to provide thermal fluid from first compartment 17 to second compartment 18. In the example shown in FIG. 1, fan 65 is located at a second end 62 of second compartment 18 to draw air through valve 55 and across the length of second compartment 18, as shown. In the example shown, energy storage device 30 is located downstream of valve 55 and upstream of fan 65. It will be appreciated that fan 65 may act as valve 55. For example, fan 65 may have an inlet fluidly connected to first compartment and an outlet fluidly connected to second compartment. The fan would be selectively energized to control the flow of thermal fluid between compartments. For example, in the example described, energizing fan draws heated air from first compartment through its inlet and pumps it from its outlet into second compartment. Fan 65 may be any device capable of providing a pressure differential to move a thermal fluid including but not limited to a pump, bellows, or fan. Use of the term "fan" therefore is not limiting.

Figure 2:
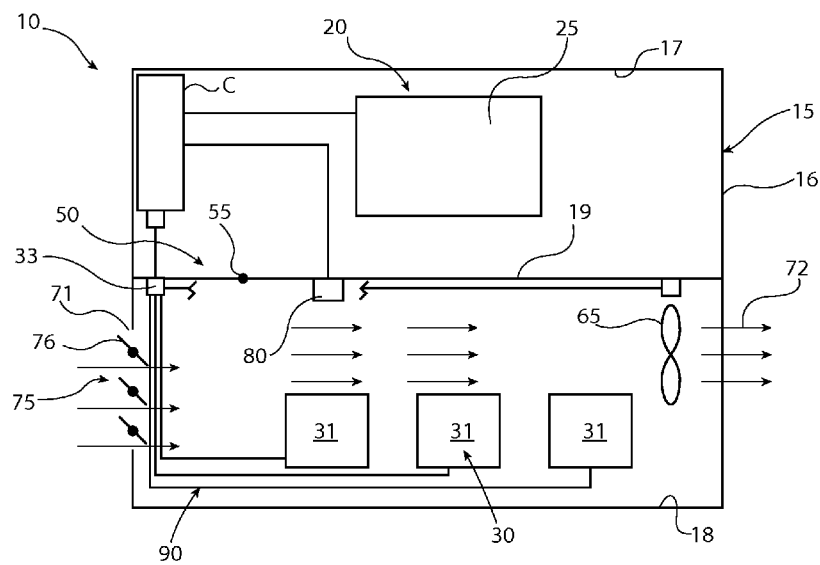
FIG. 2 is a schematic view similar to FIG. 1 shown in a cooling mode, where the valve to the motor-driven welder is closed and the vent is open to allow air to be drawn through the vent over the energy storage device.

Heat transfer assembly 50 may include a first vent 71 and a second vent 72 formed in housing 16 and in fluid communication with second compartment 18. Vents 71, 72 may be formed in any location and be located remotely of the second compartment with ducting used to fluidly connect vents 71, 72 to second compartment 18. As shown, vents 71, 72 may be formed in the wall of housing 16 adjacent to second compartment 18, and located at opposite ends 61, 62 of second compartment 18. As shown in connection with first vent 71, for example, the vent may be made to selectively open and close. For example, vent 71 includes a shutter assembly 75 that open and closes vent 71 in any known manner including but not limited to sliding, rotating or dilating. In the example shown, shutter assembly includes one or more louvers 76 rotatable between a closed position (FIG. 1) and an open position (FIG. 2). The closed position may be used when transferring heat from first compartment 17 to second compartment 18 to reduce the influence of atmospheric air on the heat transfer. Optionally, a similar shutter assembly may be used to selectively open and close second vent 72.

A fan 65 may be fluidly connected to one or more of vents 71, 72 to force air or other thermal fluids through second compartment 18. For example to provide forced air to second compartment 18, a venturi fan or muffin fan may be fluidly connected to an inlet, for example, vent 71 to provide air from an air supply, which may be cool or warm relative to the temperature of second compartment 18, to provide forced air heating or cooling of energy storage device 30. For example, atmospheric air may be provided to cool energy storage device 30, when its temperature exceeds atmospheric temperature. Additional embodiments used to provide heating and cooling of energy storage device 30 will be described in more detail herein.

In the heating configuration shown in FIG. 1, heat transfer assembly 50 includes valve 56 in an open position, vent 71 in a closed position, and vent 72 in an open position. Air heated by the motor is drawn from first compartment 17, through valve 56 in divider 19 and into second compartment 18. The fan 65, which is located at the opposite end of second compartment 18 relative to valve 56, draws the heated air over energy storage device 30 before it is exhausted from housing 16 through second vent 72.

FIG. 2 shows a cooling arrangement where atmospheric air is drawn into second compartment 18 through first vent 71 and exits second compartment at second vent 72. While valve 56 may be left in an open configuration, in FIG. 2, the valve 56 is shown in a closed configuration to maximize the cooling effect for the energy storage device 30. To cool energy storage device 30, atmospheric air is drawn in through first vent 71 and over energy storage device 30, which is located downstream of first vent 71, by a fan 65 located downstream of energy storage device 30. After air passes over energy storage device 30, it is exhausted from housing 16 at second vent 72. It will be appreciated that cooling of energy storage device 30 can occur with the fan 65 omitted or turned off relying on natural convection currents within second compartment 18.

Operation of the heat transfer assembly 50 may be controlled by a separate controller or, as shown, the welder controller C may be used. Controller C monitors temperature within second compartment 18 with a sensor 80. Sensor 80 may be any suitable temperature or thermal sensor including but not limited to a thermometer, a thermistor, thermocouple, infrared or other radiation temperature sensor, integrated circuit or semiconductor temperature transducer, and the like. Controller C may also receive feedback from energy storage device 30 via one or more sense leads 90 connected to energy storage device 30. In the example shown, a sense lead 90 extends from the positive terminal of each battery 31 within energy storage device 30. Sense lead 90 may provide voltage output information from each battery 31 to controller C.

Controller C is electrically connected to valve 55, fan 65 and shutter assembly 75. Based on the signal from temperature sensor 80, controller C may selectively operate one or more of valve 55, fan 65, and shutter assembly 75 to control heat transfer assembly 50 and adjust the temperature within second compartment 18. For example, controller C may be programmed to operate heat transfer assembly 50 in a heating configuration, for example as shown in FIG. 1, to transfer heat from motor 25 to energy storage device 30 upon detecting the temperature in second compartment is dropping toward a selected low temperature value. Likewise, upon detecting a value at or approaching a pre-selected high temperature value, controller C may configure heat transfer assembly 50 to a cooling configuration, such as the configuration shown in FIG. 2. It will be appreciated the low temperature value and high temperature value may be pre-programmed into controller or defined by the user. Multiple pre-selected ranges may be programmed into controller and selected based on the type of energy storage device 30 being used. Likewise, multiple low temperature and high temperature values may be programmed to vary the mode of operation at pre-selected temperature intervals. For example, fan speed or the degree that valve 55 or vent 71 are opened may be varied at different temperatures. It will be appreciated, however, that the configuration of heat transfer assembly 50 including switching on/off the fan, adjusting the shutter position, and opening and closing valve may be performed manually.

Figure 5:
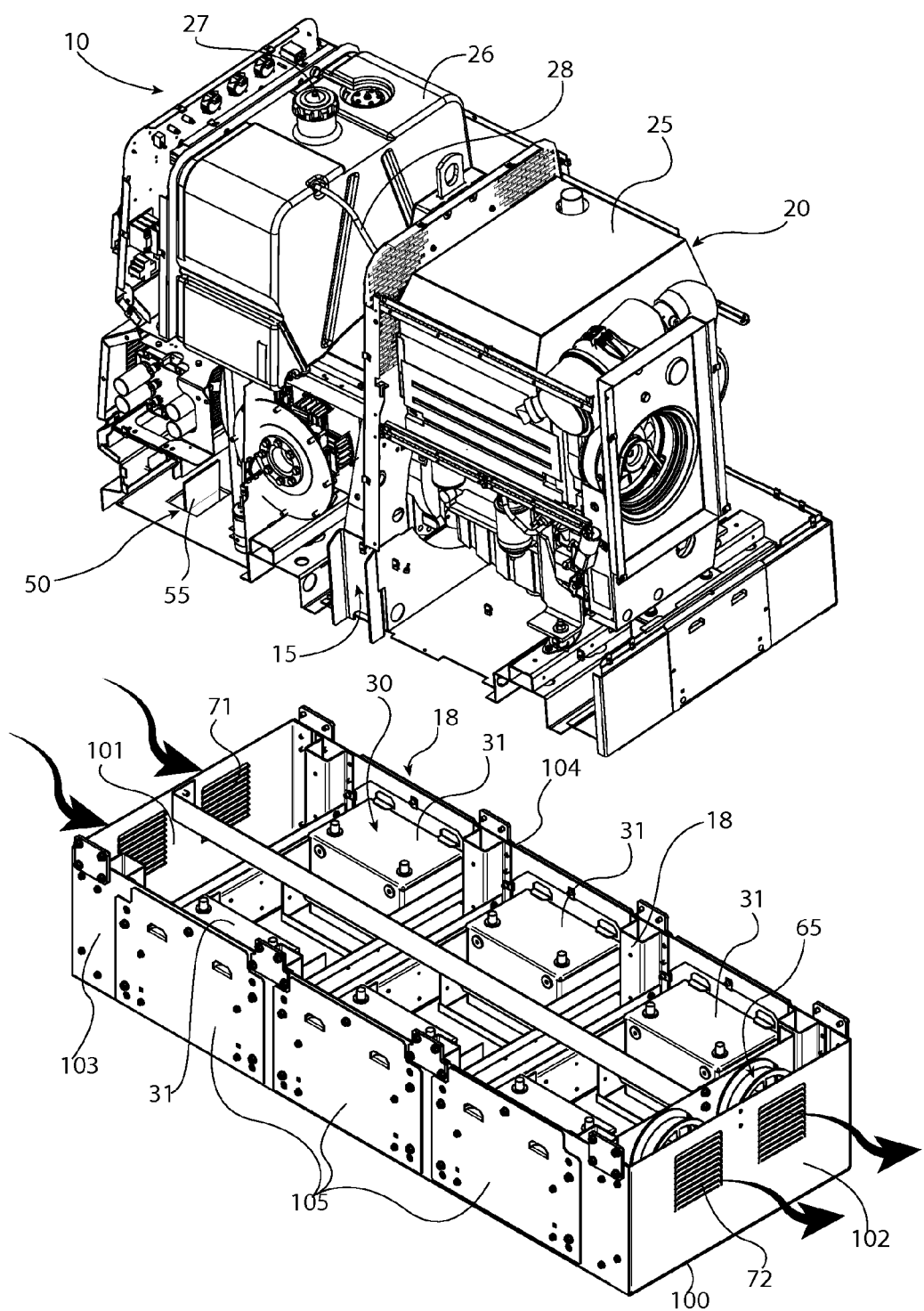
FIG. 5 is an exploded perspective view of a hybrid welder according to the invention.
Figure 6:
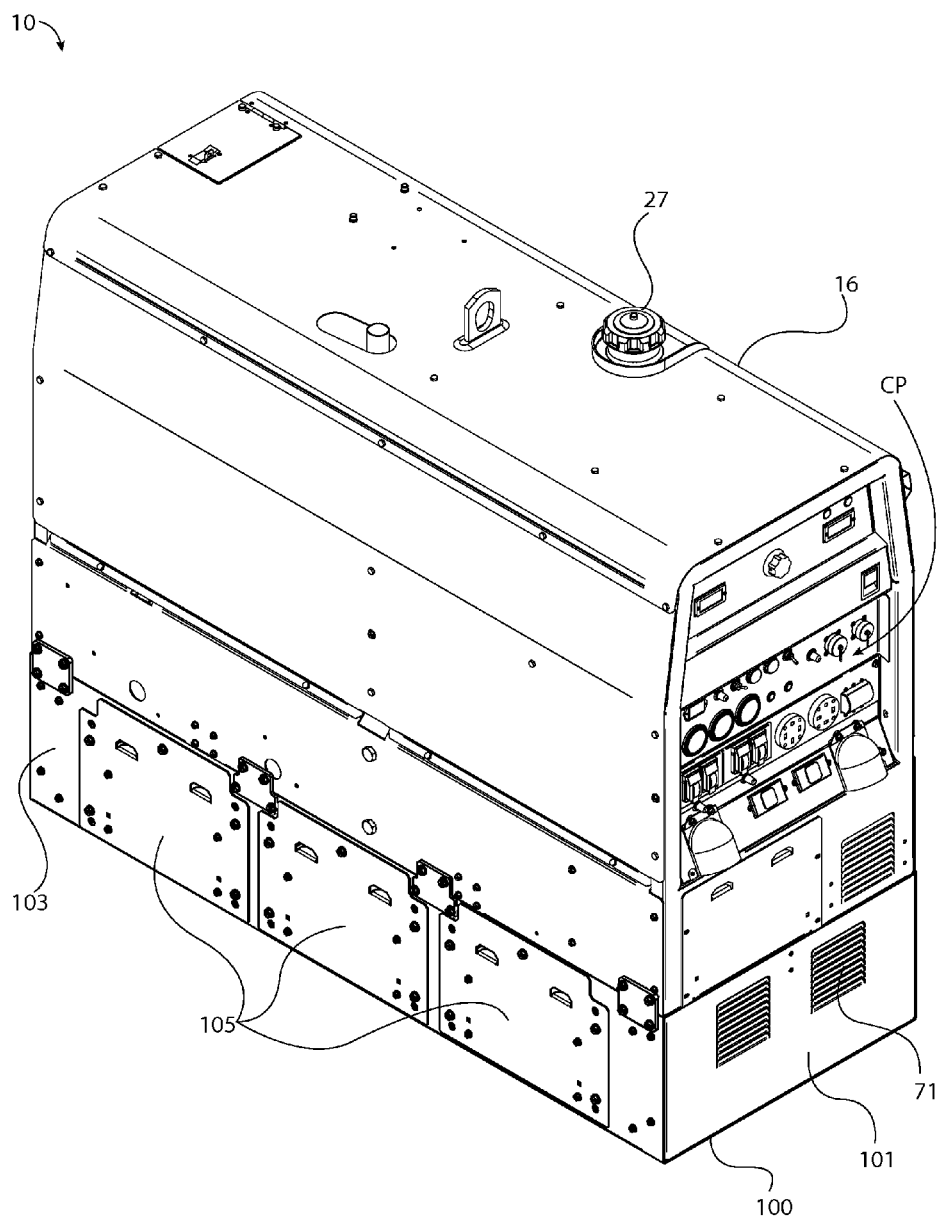
FIG. 6 is a perspective view of a hybrid welder according to the invention.

With reference to FIG. 5, one embodiment of a second compartment 18 is shown. Second compartment 18 includes a base and at least one wall extending upward from the base to form a tray like housing for energy storage device 30. In the example shown, second compartment 18 includes a rectangular base 100 with a first end wall 101 and a second end wall 102 extending upward from the base 100. First vent 71 may be located in first end wall 101, and second vent 72 may be located in second end wall 102. Opposing sidewalls 103,104 may extend upward from base 100 and connect end walls 101,102. Sidewalls 103, 104 may include access panels or drawers 105 (as shown) to access energy storage device 30 or its components. In the example shown, each battery 31 within energy storage device 30 is provided in an individual drawer 105. The entire second compartment 18 may likewise be removable from housing 16 to provide access to energy storage device 30 or to remain/replace energy storage device 30. Releasable attachment of second compartment 18 may be made by a releasable connector 107 including but not limited to latch assemblies, clips, fasteners, bayonet connections, or custom connectors. In the example shown, releasable connector 107 includes connecting tabs 108 provided to releasably attach second compartment 18 to housing 16. Tabs 108 may be formed as part of second compartment 18, or, as shown, attached to second compartment 18 by a fastener including but not limited to a weld, threaded fastener, clip pin or rivet. Tabs 108 include a portion that extends upward from the upper extremity of the compartment wall to overlap a portion of housing 16 adjacent to first compartment 17. Fasteners 109 may extend through tabs 108 and into first compartment 17 to attach the second compartment 18 as part of housing 16. To release second compartment 18 from housing 16, the fasteners 109 is removable to disconnect the tab 108, from housing 16. Removable fasteners 109 of any type may be used including but not limited to latches, clips threaded fasteners, pins, and the like. It also will be appreciated that tabs 108 may extend from compartment 17 with removable fasteners used to connect the tab 108 to second compartment 18 with the same effect.

Figure 3:
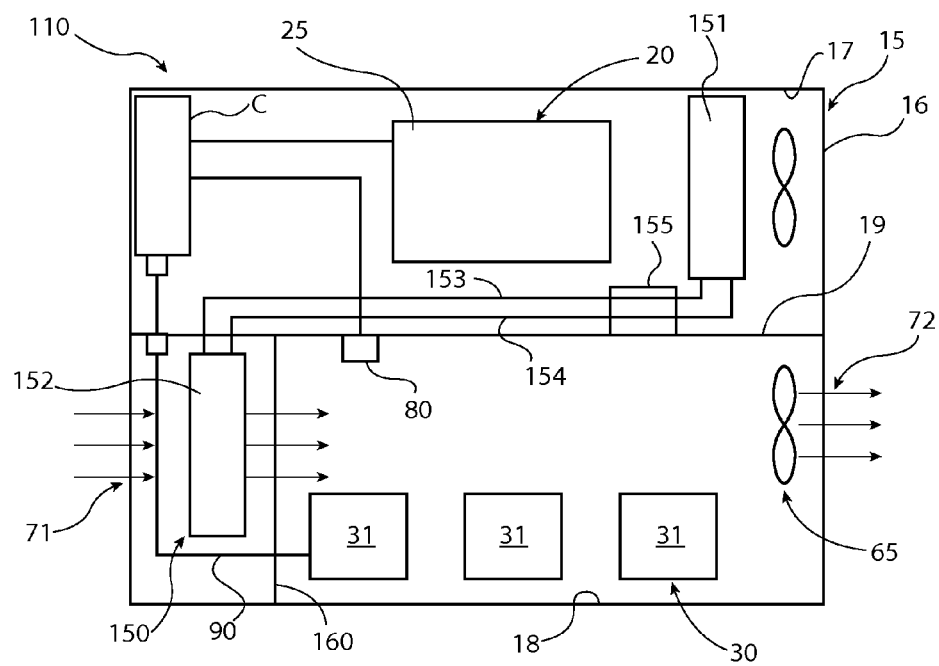
FIG. 3 is a schematic view of an alternative embodiment of the thermal control system for a hybrid welder employing a first heat exchanger in thermal communication with the motor-driven welder and a second heat exchanger in thermal communication with the energy storage device, where the first and second heat exchangers are thermally connected to selectively transfer heat from the first heat exchanger to the second heat exchanger.

An alternative hybrid welder, generally indicated by the number 110, is shown in FIG. 3. Like numbers are used to refer to like components. Hybrid welder 110 includes a motor driven assembly 20 and energy storage device 30 and controller C. Hybrid welder 110 includes an alternative heat transfer assembly 150. Heat transfer assembly 150 also transfers heat from motor 25 to energy storage device 30. To perform this heat transfer, heat transfer assembly 150 includes a first heat exchanger 151 and a second heat exchanger 152 that are fluidly connected to each other by suitable conduits 153,154. First heat exchanger 151 is located in first compartment 17 and receives heat from motor 25. The second heat exchanger 152 is located in second compartment 18. A heat transfer fluid is circulated through first heat exchanger 151 to absorb heat from motor 25 and then circulated through second heat exchanger to transfer the heat from motor 25 to second compartment 18 to heat energy storage device 30. A pump 155 or other sending unit is provided to circulate the heat transfer fluid. Pump 155 may be connected to controller C to automatically operate pump 155. Or a switch or other control may be provided to manually operate pump 155. To facilitate heat transfer from second heat exchanger 152 to energy storage device, a fan 65 may be provided downstream of second heat exchanger 152 to draw air through second heat exchanger 152. As shown, heat exchanger 152 may be upstream of energy storage device 30 with the fan 65 downstream of energy storage device such that the flow of heated air from second heat exchanger 152 passes over energy storage device 30. Likewise first and second vents 71,72 may be provided in second compartment to facilitate circulation of air. In the example shown, a first vent 71 is located upstream of second heat exchanger 152 and at one end of second compartment 18, and a second vent 72 is located at an opposite end of second compartment 18 and downstream relative to fan 65.

As in the previous embodiment, controller C may receive temperature information from a sensor 80 adapted to monitor the temperature of second compartment 18. Likewise controller C may receive information from sense leads on energy storage device 30 to monitor the operating condition of energy storage device 30. As in the previous embodiment, controller C may be connected to heat transfer assembly 150 and adapt the operation or configuration of heat transfer assembly 150 based to transfer heat from motor 25 to energy storage device 30.

Figure 3A:
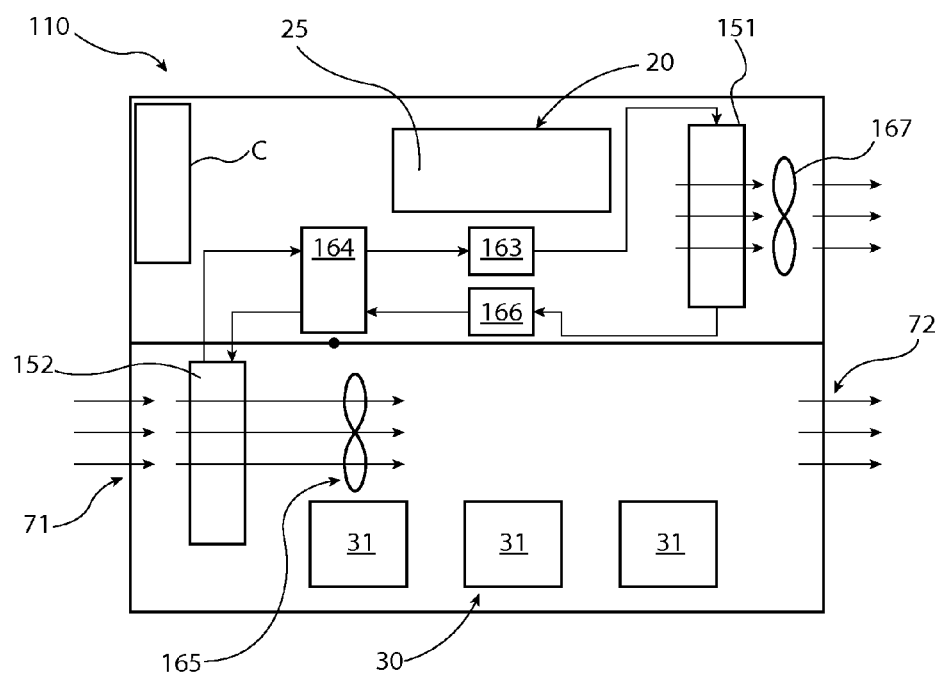
FIG. 3A is a schematic view similar to FIG. 3 showing a further alternative embodiment including a compressor and expansion valve used to operate the first and second heat exchanger in a cooling mode.

Optionally, as shown in FIG. 3A, heat transfer assembly 150 may be configured to perform cooling. For example, heat transfer assembly 150 may include a compressor 163, expansion valve 164, and dryer 166 may be provided within the thermal fluid conduit loop between first heat exchanger 151 and a second heat exchanger 152. As shown, compressor 163 may have an outlet port in communication with first heat exchanger 151 and an inlet port in communication with the second heat exchanger 152. Expansion valve 164 may be interposed between compressor 163 and second heat exchanger 152 such that thermal fluid exiting second heat exchanger 152 passes through expansion valve 164 before returning to compressor 163. First heat exchanger 151 is connected to second heat exchanger 152. Thermal fluid from first heat exchanger 151 may pass through expression valve 164 before returning to second heat exchanger 152. As an additional option, a dryer 166 may be provided upstream of expansion valve 164 to remove unwanted fluid from thermal fluid before it enters expansion valve 164.

Compressed thermal fluid exits compressor 163 and passes through first heat exchanger 151. Heat is removed from the compressed thermal fluid as it passes through first heat exchanger 151. Optionally, a fan 167 may be provided to assist in cooling thermal fluid as it passes through first heat exchanger 151. Cooler compressed thermal fluid exits first heat exchanger 151. A dryer 166 may be provided downstream of first heat exchanger 151 and upstream of second heat exchanger 152 and expansion valve 164 to remove moisture that may freeze upon expansion of the compressed thermal fluid.

The compressed fluid travels through expansion valve 164, which allows thermal fluid to expand before entering second heat exchanger 152. Cold low pressure thermal fluid exits expansion valve 164 and is routed through second heat exchanger 152. Second heat exchanger 152 may located near energy storage device 30 to provide cooling thereto by removing heat from the air or other fluid surrounding energy storage device 30. Alternatively, second heat exchanger 152 may contact energy storage device 30 to directly remove heat therefrom. Or, as shown, a fan 165 may be provided to draw air through second heat exchanger and direct cooler air toward energy storage device 30. In the embodiment shown, second heat exchanger 152 and fan 165 are located adjacent to each other within second compartment 18 and upstream of energy storage device 30. Air may exit second compartment at second vent 72. It will be appreciated that these components may be located remotely and fluid communication between fan and energy storage device provided by appropriate ducting.

In accordance with another aspect of the invention, heat transfer assembly 150 may be used to heat/cool an additional compartment. This additional compartment may be part of housing 16 or located remotely. The additional compartment is thermally connected to heat transfer assembly, for example, by ducting or a conduit that provides a thermal fluid to third compartment. For example, ducting may be used to route heated air produced by motor 25 or from heat transfer fluid circulating through first heat exchanger toward third compartment. As a further alternative, hot compressed thermal fluid exiting first heat exchanger may be routed through a third heat exchanger in thermal contact with third compartment to transfer heat thereto. Similarly, cooled fluid from second heat exchanger may be routed toward third compartment to remove heat therefrom and cool third compartment. For example, the fan associated with second heat exchanger may direct cooling air from second heat exchanger to third compartment as well as energy storage device.

It is understood, that a byproduct of the cooling process may be formation of condensation on the second heat exchanger. A drain may be provided in second compartment to remove this condensate from housing 16. The surface leading to drain may be sloped away from energy storage device and or other electrical components within welder, to ensure that inadvertent shorting does not occur. Drain may be provided in a drip pan located beneath second heat exchanger. As a further option, drain may be connected to a remote collection container. The collection container may be removable or provided with its own drain that can be selectively open, for example, when the welder is not operating, to safely remove the condensate.

Since energy storage device may not require heating/cooling at a given time, the ducting may include a second valve to control the flow of heated/cooled air between second and third compartments. A second temperature sensor may be provided in third compartment and connected to the welder controller C to control operation of heat transfer assembly 150. Controller C may monitor the temperature within second compartment and third compartment to selectively operate heat transfer assembly 150 in a heating or cooling mode and to control whether heating or cooling fluid is provided to one or both of the second and third compartments. For example, third compartment may be consumable compartment in which consumables are placed to raise their temperature above the ambient temperature before use. Alternatively, heat transfer assembly 150 may be used to dehumidify air within consumable compartment to reduce the likelihood of oxidation of the consumables. It will be appreciated that the consumable compartment example is not limiting, and third compartment may be used for any purpose where heating or cooling is desirable including but not limited to providing a refrigerated compartment in which food or beverages may be placed.

In accordance with another aspect of the invention, it may be desirable to remove energy storage device from second compartment or access energy storage device 30. In some instances, a portion of second compartment containing energy storage device may be removed. To that end, second heat exchanger 152 may be separated from energy storage device 30 by a divider 160. Divider 160 may be any frame member or panel that separates second heat exchanger 152 from energy storage device 30 and allows separate access or removal of energy storage device 30. For example, energy storage device 30 may be housed within a tray that attaches to the base of first compartment 17. The end wall of this tray or box may form divider 160 when the tray is attached.

Figure 4:
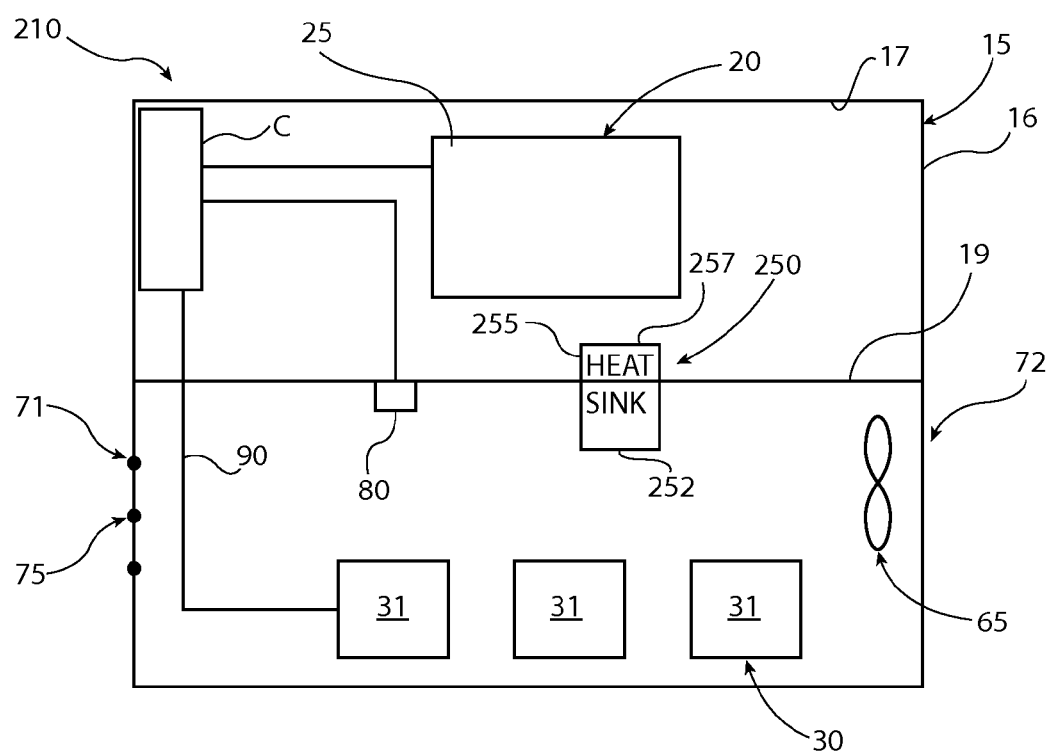
FIG. 4 is a schematic view of another alternative embodiment of the present invention showing a heat sink extending from the motor-driven welder compartment to the energy storage device compartment to transfer heat generated by the motor-driven welder to the energy storage device.

A second alternative hybrid welder is indicated by the number 210 in FIG. 4. Like numbers have been used to refer to like components. Hybrid welder 210 includes another alternative heat transfer assembly 250. Heat transfer assembly 250 is a heat sink 255 that conducts heat from motor 25 and transfers it to energy storage device 30. For example, heat sink 255 may be mounted such that a first portion 251 of heat sink 255 is in thermal communication with motor 25 and a second portion 252 is in thermal communication with energy storage device 30. In the example shown, first portion 251 of heat sink 255 is located in first compartment 17, where motor 25 is housed. Second portion 252 of heat sink 255 is located in second compartment 18 where energy storage device 30 is housed. To facilitate heat transfer to energy storage device 30, a fan 65 may be provided to draw air over second portion of heat sink 252 and energy storage device 30.

Heat transfer assembly 250 and fan 65 may be connected to a controller C as described in the previous embodiment to control operation thereof based on feedback from a sensor 80 or sense lead 90 connected to energy storage device 30.

While principles and modes of operation have been explained and illustrated with regard to particular embodiments, it must be understood that this may be practiced otherwise than as specifically explained and illustrated without departing from its spirit or scope.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed:

1. A hybrid welder comprising:
   a housing defining a first compartment and a second compartment separated by a divider, wherein the divider includes a valve therein, the valve includes an open position permitting fluid from the first compartment to flow to the second compartment;
   a motor-driven welder assembly housed within the first compartment, the motor-driven welder assembly including a motor;
   an energy storage device housed within the second compartment, the energy storage device being electrically connected to the motor-driven welder assembly;
   a heat transfer assembly, the heat transfer assembly being in thermal communication with the motor and the energy storage device, wherein the heat transfer assembly includes a fan in fluid communication with the second compartment, the fan draws fluid heated by the motor over the energy storage device;
   a controller connected to a temperature sensor in the second compartment and connected to the valve, wherein the controller selectively opens the valve based on feedback from the temperature sensor;
   wherein the second compartment has a first vent and a second vent, the first vent being located on one side of the energy storage device and the second vent being located at another side of the energy storage device, wherein the energy storage device is located between the first vent and the second vent; and
   wherein the first vent includes a shutter assembly electrically connected to the controller, the shutter assembly selectively opens and closes the first vent.

2. The hybrid welder of claim 1, wherein
   the divider defines an opening wherein the valve is located at the opening operable to selectively open and close the opening, and wherein the fan draws heated air from the motor through the opening over the energy storage device.

3. The hybrid welder of claim 1, wherein
   the second compartment is releasably attached to the housing.

4. The hybrid welder of claim 1, wherein
   the shutter assembly closes the first vent when the valve is in an open position.

5. The hybrid welder of claim 1, wherein
   the shutter assembly opens the first vent when the valve is in a closed position.

6. The hybrid welder of claim 1, wherein
   the shutter assembly includes a louver rotatable between an open position and a closed position.

7. The hybrid welder of claim 1, wherein
   the fan is connected to the controller, wherein the controller selectively activates the fan to draw air through the valve when the valve is in an open position.

8. A hybrid welder comprising:
   a housing defining a first compartment and a second compartment separated by a divider, wherein the divider includes a valve therein, the valve includes an open position permitting fluid from the first compartment to flow to the second compartment;

a motor driven welder assembly housed within the first compartment, the motor-driven welder assembly including a motor;

an energy storage device housed within the second compartment, the energy storage device being electrically connected to the motor-driven welder assembly;

means for selectively transferring heat from the motor-driven welder assembly to the energy storage device, wherein said means for selectively transferring heat include a fan in fluid communication with the second compartment, the fan draws heat from the motor over the energy storage device; and a controller connected to a temperature sensor in the second compartment and connected to the valve, wherein the controller selectively opens the valve based on feedback from the temperature sensor;

wherein the second compartment has an air ingress and an air egress, the air ingress being located on one side of the energy storage device and the air egress being located at another side of the energy storage device, wherein the energy storage device is located between the air ingress and the air egress; and wherein the air ingress includes a shutter assembly electrically connected to the controller, the shutter assembly selectively opens and closes the air ingress.

\* \* \* \* \*